Figure 5:
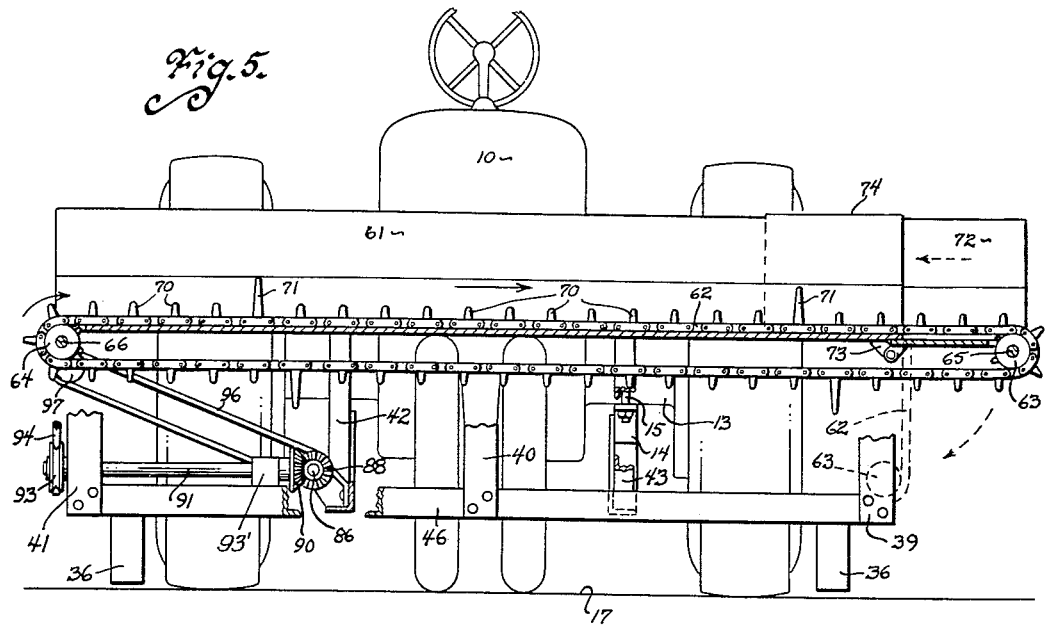

Dec. 20, 1955     H. J. KUHLMAN     2,727,350
SIDE DELIVERY RAKE
Filed Nov. 22, 1950     3 Sheets-Sheet 1
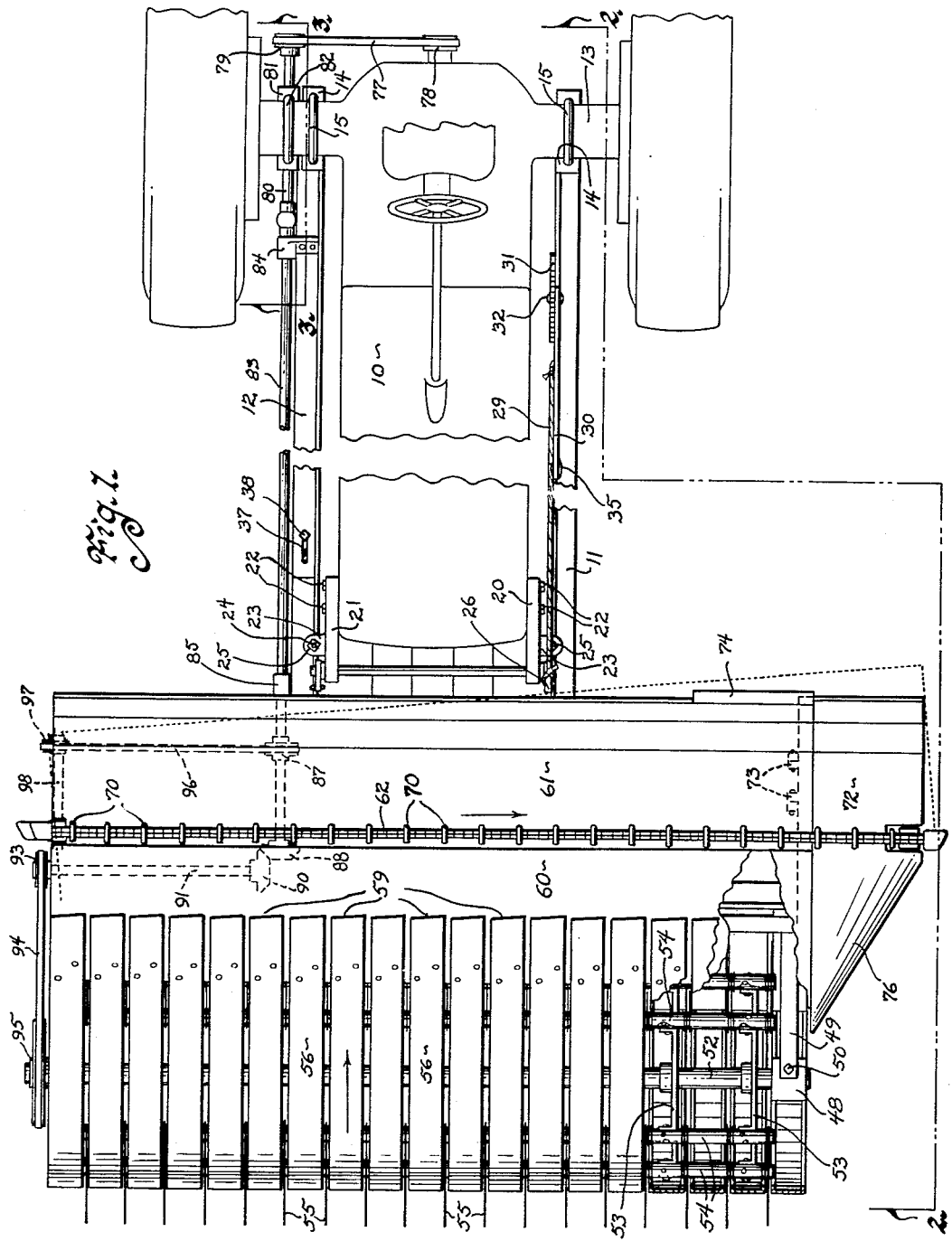
Inventor
Henry J. Kuhlman
by M. Talbert Dick
Attorney
Witness
Edward P. Seeley Dec. 20, 1955
H. J. KUHLMAN
2,727,350
SIDE DELIVERY RAKE
Filed Nov. 22, 1950
3 Sheets-Sheet 2
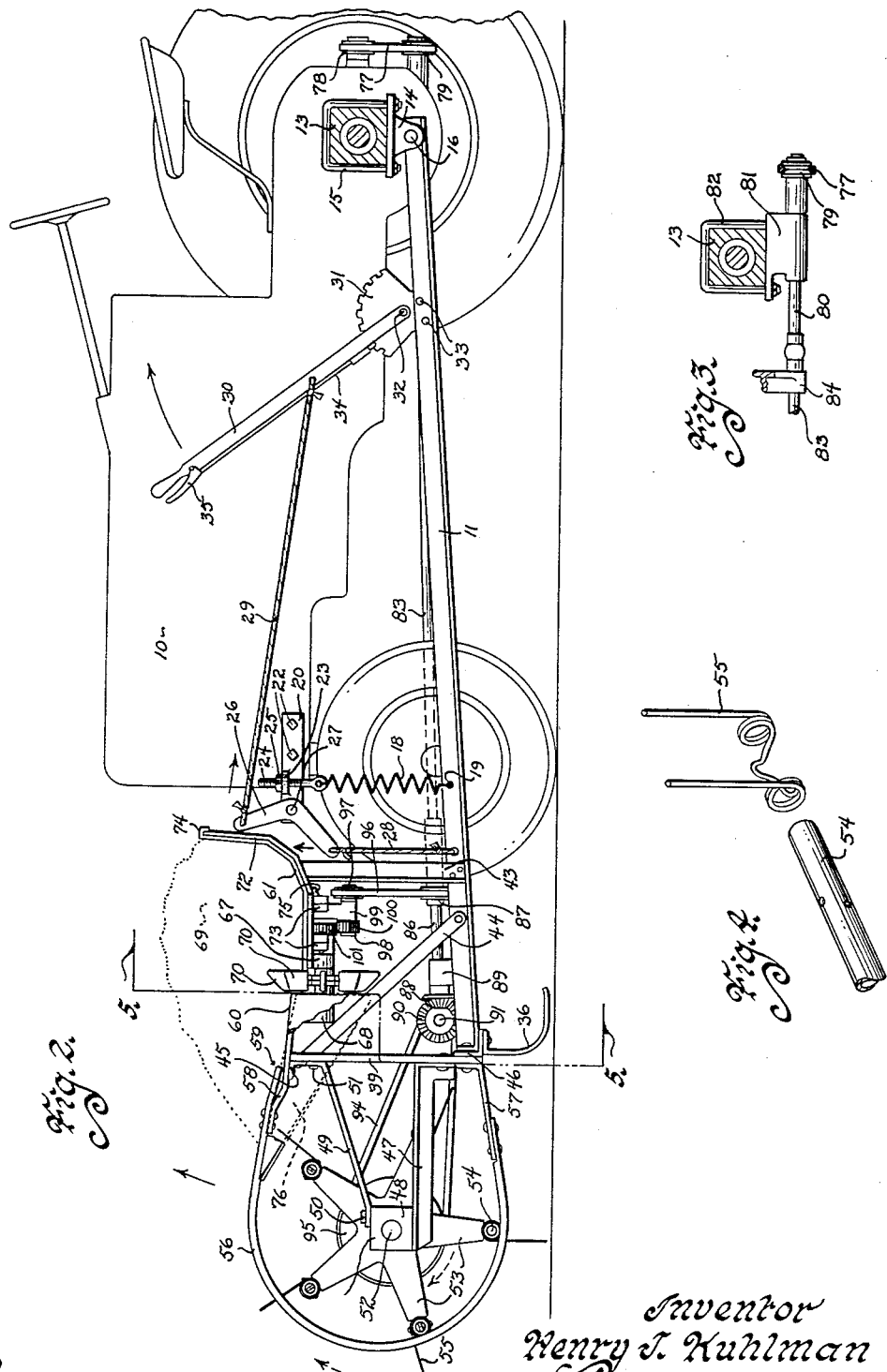
Inventor
Henry J. Kuhlman
by M. Talbert Dick
Attorney
Witness
Edw. P. Seeley Dec. 20, 1955  H. J. KUHLMAN  2,727,350
SIDE DELIVERY RAKE
Filed Nov. 22, 1950  3 Sheets-Sheet 3

Inventor
Henry J. Kuhlman
by M. Talbert Dick
Attorney

Witness
Edward P. Leby

United States Patent Office

2,727,350
Patented Dec. 20, 1955

2,727,350

SIDE DELIVERY RAKE

Henry J. Kuhlman, Waterloo, Iowa

Application November 22, 1950, Serial No. 197,145

4 Claims. (Cl. 56—376)

My invention relates to the art of raking and stacking cut agricultural plant materials or products of the sort normally used for animal feed or bedding and generally known as hay. Specifically I have invented a side delivery rake that rakes agricultural plant products and materials into loose piles that present the opposite side of the raked materials to the sun than that so exposed before the raking operation.

Raking hay into windrows for direct loading or baling is an old art and the machines developed for this purpose are legion. Machines known heretofore, however, have had the common failing of packing the material into relatively tight rolls or bundles as it is raked into rows. Because the raked rolls of previously known machines are tight, the material to be raked must be entirely dry before being raked. A considerable period of good drying weather is essential to the satisfactory production of desirable hay therefore.

Also it sometimes happens that a day or two of dampness may cause the hay to take longer to dry than usual. More important, however, is the effect of a rainy day after the hay is raked, and before it is baled or stored in bulk. Tightly packed hay that gets wet is an ideal heat generator and many serious spontaneous combustion fires have been known to have started from wet hay that is not ventilated. Losses of time and effort from spontaneous combustion hay fires can be avoided, however, if wet hay is ventilated to avoid generating vaporizing combusting temperatures.

Another failing of previously existing side delivery rakes is the tendency of the rake to destroy much of the value of the hay or the like. The destruction of the value of the hay results from the dragging or pushing action of the previously known rakes exerted on the material with little or no lifting force applied to it. This pushing and dragging without lifting forces at least some of the material to be dragged through the stubble standing in the field. When the hay is thus dragged through the stubble, many of the leaves and other food containing portions of the hay are dislodged from the stems and substantially the only thing remaining, in the most exaggerated cases, is merely the straw or stem portion. I refer to this action of many commonly known side delivery rakes as threshing. When these common forms of rake are of the type that is drawn behind the prime mover, the threshing action is accentuated by the fact that the prime mover has mashed the hay down into the stubble before the rake attempts to move it.

To summarize, therefore, one can say that the ideal side delivery rake is one that gently lifts the hay from the stubble without mashing or threshing it and piles it in a loose and fluffy fashion in a relatively broad windrow that is as nearly regular in cross section as possible. It can be seen from the prior discussion, furthermore, that the side delivery rakes of the prior art fall far short of achieving the ideal.

While I have not entirely solved these problems of the prior art, I have approached a total solution by constructing a side delivery rake that gently lifts the cut products from the stubble in the field ahead of the prime mover with the same side facing upwardly as did when the material was on the ground. My rake then places the material so lifted on an endless conveyor arrangement that slides the material to one end of the rake and drops it over the end. In dropping the material over the end, however, the products are turned over by being dumped from a substantial distance above the surface of the ground. Because the material is turned over, the surface of the material, that previously to being raked faced the ground, now faces upwardly into the sun and air. I achieve a broader and more regular windrow in part also by means of my specially designed dumping platform. This platform is arranged to distribute the hay over a relatively wide windrow in a fashion that minimizes peaking and approaches the ideal uniform cross section. Furthermore, by conveying and dropping the material as opposed to raking it into a tight roll, the material is left in a comparatively loose pile. This loose pile is well ventilated and does not tend to generate heat of a degree necessary for spontaneous combustion. Also, of course, hay that has been raked and then rained on can be turned over to aid the drying of the hay.

In view of the foregoing, therefore, the principal object of my invention is to provide a side delivery rake that will turn raked hay over to present its previously underside to the sun and air as the hay is piled.

It is a further object of my invention to provide a side delivery rake that piles the raked material loosely.

It is a further object of my invention to provide a side delivery rake that will turn over piled hay.

It is a further object of my invention to provide a side delivery rake that avoids a customary sweeping rolling action that forms the windrow into a "rope."

It is a further object of my invention to provide a side delivery rake that forms a relatively wide windrow.

It is still a further object of my invention to provide a side delivery rake that avoids peaking.

It is a further object of my invention to provide a side delivery rake that lifts the material to be raked from the stubble gently and avoids condensing and threshing the agricultural material as would result from shoving the material laterally through the stubble.

It is still a further object of my invention to provide a side delivery rake that as outlined hereinbefore combines the features so far described with good visability during operation with the advantage of raking the hay before it is crushed and mashed under the weight of the prime mover.

It is a further object of my invention to provide a side delivery rake that is economical to manufacture, durable in use and simple to operate.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a top view of my side delivery rake mounted on a prime mover, a portion of which is omitted to conserve space. A portion of my rake is broken away to more fully illustrate its construction. Broken lines show hidden parts and dotted lines illustrate an adjusted position of the rake with respect to the prime mover, Fig. 2 is a side view of my side delivery rake taken on line 2—2 of Fig. 1. Broken lines illustrate hidden parts and the position of raked material on the supporting table platform trough.

Figure 6:
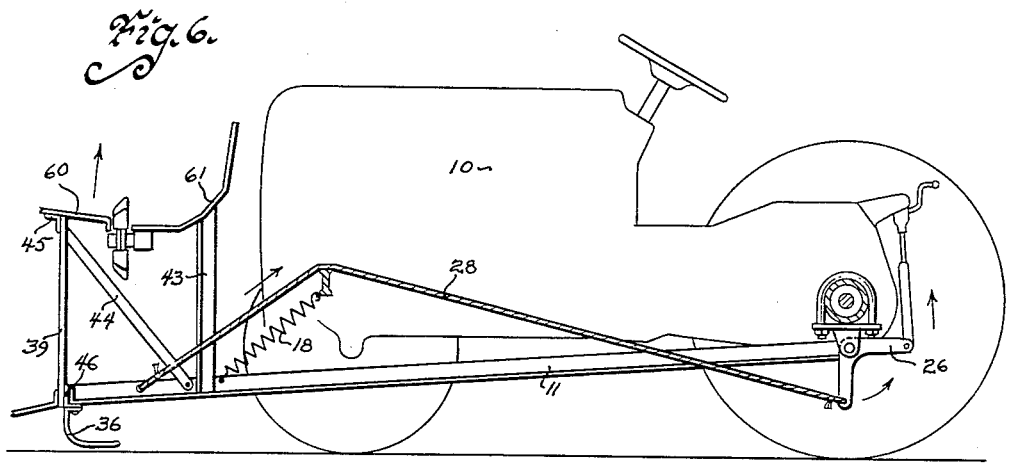

Fig. 3 is a partial cross sectional view of the prime mover rear axle taken on the line 3—3 of Fig. 1, Fig. 4 is an exploded enlarged fragmentary perspective view of a rake rod and pair of raking fingers, Fig. 5 is a cross sectional view of my device on a prime mover taken on the line 5—5 of Fig. 2 and with a portion of the device broken away to more fully illustrate its construction. Broken lines show the folded position of the extending portion of the supporting table trough platform and conveyor, and Fig. 6 is a side schematic view of a second species of the raising and lowering mechanism on a tractor having widespread front wheels.

Referring to the drawings I have used the numeral 10 to designate a prime mover such as a farm tractor or the like to which my side delivery rake is secured upon which it depends, in part, for support and entirely for the necessary power to operate. The working parts of my device are secured to a frame that has the beams 11 and 12 that are similarly and pivotally secured to the rear axle housing 13 by means of the like brackets 14 which are clamped to the said housing by the U-bolts 15 respectively. The beams and the brackets are pivotally secured together by the cylindrical member 16 which may be a bolt, rivet or any other appropriate pivot point. The forward portion of the two beams 11 and 12 are supported in a floating manner just above or in light contact with a ground surface such as that designated by the numeral 17 by means of a pair of counterbalance means such as the springs 18. One end of each of these springs is secured to one of the beams in a non-adjustable fashion as by a hook formed on the end of the spring being hooked into a hole 19 in the beams. The other end of the springs are vertically and adjustably secured to the tractor by means of the brackets 20 and 21 that are rigidly secured to the tractor frame in some manner as by the bolts 22. Pierced ears 23 extend from the brackets horizontally and through which the eye bolts 24 are threaded. Nuts 25 are threaded on the bolts to permit a vertical adjustment of the upward pressure of the springs 18. Bell crank 26 is pivotally secured to the bracket 20 by any suitable means as by the rivet 27 or the like. Flexible elements 28 and 29 connect the beam 11 and one of the bell crank and the other end of the bell crank to the height control lever 30. This lever is pivotally mounted on the segment 31 by means of the pivot 32 and the segment is secured rigidly to the beam 11 by means of rivets 33 or the like. The height control lever may be locked in any one of various positions by means of the conventional lock rod 34 and its control 35. The other supporting means for the front end of the device are the runner feet 36 that are rigidly secured to the lower forward ends of the beams 11 and 12 respectively. The structure just recited supports the device in a floating attitude just above or lightly touching the surface of the ground when the lever 30 is in the position shown in the Fig. 2. When the lever 30 is moved as indicated by the solid line arrow, however, the rake is lifted by the short solid line arrow shown over the rotary rake. This structure just recited is neither new nor claimed by me as part of the invention.

The rake assembly may be canted as is shown in Fig. 1 by the dotted line rectangle. Any of numerous suitable means may be provided for accomplishing this adjustment of the rake and I have shown a simple and effective one. The slot 37 provided in one portion of beam 12 with the bolt assembly 38 provides a simple means of adjusting the length of beam 12 for the best angle for any particular type of hay.

The rake itself is supported on the beams 11 and 12 by any suitable frame structure such as that here shown as composed of the uprights 39, 40, 41, 42 and 43. Diagonal braces 44 and a similar brace on the other side, but not shown, adds rigidity to the structure. Longitudinal beams designated 45 and 46 are rigidly secured to the balance of the structure in any suitable manner. At opposite sides of the front of the frame structure are the bearing support brackets 47 and a similar bracket not shown that are rigidly secured to the uprights 39 and 40 respectively. These brackets support bearings such as the one designated 48 in Fig. 2. Additional support may be given to the bearings such as 48 by means of any suitable bracing such as the brace 49 that is secured to the bearing and forward upright in a suitable manner as by the cap screw 50 to the bearing and the rivet 51 to the post. These bearing members rotatably support the shaft 52 that has several spiders 53 fixed to it. At the end of the spider arms are the finger rods 54 that support the usual spring fingers 55. The fingers extend outward in a radial direction from the cage assembly as shown in Fig. 2. A plurality of bands designated 56 flank the fingers as is most clearly shown in Fig. 1. These bands serve to support the material being raked as it is carried up and over the top of the cage assembly by the raking fingers. Because these bands are closely adjacent to the moving fingers, it is essential that they do not move in the least and thus interfere with the action of the cage. The lower ends of the bands are secured to an equal number of lower band supporting brackets designated by the numeral 57 while the upper ends are secured to similar brackets 58. The brackets, both upper and lower, must be extremely rigid to avoid letting the bands move laterally as pointed out above. It should also be noted that the upper rear ends 59 of the bands 56 are cut on the bias with the longer sides of the bands all arranged on the same side with respect to the rake generally for a reason that will be explained in detail when the total machine has been described.

Supported on the rear ends of the brackets 58 and the rear portion of the frame is a divided raked material supporting platform trough table, the forward portion of which is designated 60 and the rear portion 61. Hay and other material that may be lifted by the rotary rake is shoved on to this divided table from which place it is removed by the endless conveyor flat flexible chain 62 that is reeved over the rotatable pulley cog wheel elements 63 and 64. These rotatable cog wheels are mounted on the shafts 65 and 66 respectively that are appropriately journaled in the bearings 67 and 68 in the case of shaft 65 and similar bearings in the case of the shaft 66. These bearings are appropriately positioned on the under side of the divided table so that the top of the conveyor is substantially at the level of the forward portion 60 of the table. It will be noted that the rear portion 61 of the table trough is slightly lower than the top of the flexible chain conveyor to permit gravity to aid in the passing of the cut agricultural plant material 59 over the chain to distribute itself over the table trough as shown in Fig. 2. The flat flexible conveyor is provided with a plurality of upstanding projections or lugs 70 for engaging and moving the agricultural products on the table platform. It should be noted that the majority of these lugs are of the same size and that being rather short. These short lugs are satisfactory during most of the hay moving operation, and it is only occasionally necessary to have a longer one that will catch any excess material that the shorter lugs will not move. In a machine such as mine, which has a width of only slightly over eight feet, for example, four of such longer lugs designated 71 were found to be adequate.

The right hand end of the machine supporting platform trough as it is shown in Fig. 5 extends beyond the end of the rotary rake to form a dumping platform table shelf designated 72 which permits the raked material to be carried out beyond the machine. The platform is not rigidly secured to the table, however, but should be secured to permit its being moved into a rearward projection of the rotary rake. A satisfactory structure is here shown with the forward portion of the extension hinged to fold downwardly when not in use with the hinges 73 that are secured respectively to the extension and the divided table portions. Any suitable means may be used to hold the extension in a horizontal position when it is in use such as a bar as is often used with a drop leaf table. The portions of the dumping platform table that are not horizontal may be slidably retracted onto the portion 61 of the divided table trough by means of the upper and lower track elements 74 and 75 respectively. Thus the whole dumping platform may be hinged and slid behind the rake portion. It should also be noted that the forward portion designated 76 of the extension 72 slants forwardly and curves downwardly at its outer edge.

This structure of the dumping platform serves two functions. In the first place, any hay or similar matter that extends over the right hand side of the rack as viewed in Fig. 5 will be guided to one side and downwardly by the slanting and curved forward edge portion of the dumping table extension 72. A second and more important function of this slanting forward edge is to permit the forward part of the stream of argricultural material that is being conveyed across the divided table platform to drop to the ground before the rearward portion of a given section of hay or like on the table platform. Since as the hay moves across the table platform that portion of the hay which is forward of the chain conveyor will lose its underneath support sooner than will the rearward portion, any given section of hay will tend to be spread out over a wider area than would be the case if the whole dumping table extended straight outwardly to an edge that was entirely parallel to the longitudinal axis of the prime mover. As the conveyor pulls the hay across, therefore, the forwardly arranged hay first starts dipping downwardly toward the ground and is later followed by similar action at the rearward portion of the same bunch of hay which causes an action somewhat similar to a plow share turning a furrow so that the hay is turned over exactly 180°, thus exposing the relatively green uncured side of the hay that previously faced the ground surface. This turning action of the dumping table with the conveyor positioned a substantial distance above the ground surface, together with the broadening effect produced on the window thus formed, are two of the major advantages of my device. A third major advantage of my device results from the dropping of the hay, or like, loosely on top of the stubble which effect can be achieved even without the special structure of the dumping table.

The advantage of having the platform capable of being moved into line with the rake is simply that the rake may then be made a standard eight foot width with the advantages of an extending dumping table while in use that may be retracted to be in line with the outermost edges of the rake for transportation of the rake on the highway.

It should be noted at this point the advantage of having the slanting rear ends 59 of the bands 56 all slanted in such a manner that their shorter ends are first presented to any hay or like material being moved across the divided platform supporting trough. The purpose of having the ends so slanted is to avoid the snagging effect of the band ends were they cut straight. The total effect of the band ends, therefore, is somewhat that of a large saw-blade with the slanting sides of the teeth presented to the cut agricultural produce moving across the table platform. In this connection it should also be pointed out that the table platform should be broad enough to receive across its width the longest possible hay elements that the rake is expected to rake successfully. The purpose of having the table platform this broad is to avoid curling the ends of the hay pieces upwardly and back upon themselves as the rotary rake lifts and deposits hay onto the table platform. If the platform were so narrow that hay moving onto the platform and striking its upwardly slant and nearly vertical back member were to be curled back upon itself, the end result would be little more satisfactory than in the case of the rotary sweeping action type of side delivery rakes as far as good ventilation of the resulting windrow is concerned.

Both the rake and the transverse conveyor are powered from the prime mover and the means for doing this could be any suitable gear or belt and pulley arrangement which I have shown here for purposes of illustration as being the belt 77 reeved over the pulleys 78 secured to the power take-off of the tractor of the like and pulley 79 that is fixed to the end of drive shaft 80 which is rotatably supported by the bracket 81 that is clamped to the rear axle housing 13 by means of the U-bolt 82 or in any other appropriate manner. Extension shaft 83 that is rotatably supported by bearing bracket 84 at one end and by the bearing 85 at the other, transmits the power to the forward end of the frame. Auxiliary extension shaft 86 is slidably and universally journaled to extension shaft 83 to allow the relative movement necessary in the power system when the rake is canted. On the auxiliary extension shaft 86 are secured a pulley wheel designated 87 and a bevel gear designated 88. The shaft is suitably supported by its connection to the extension shaft 83 at one end and by the auxiliary extension shaft bearing 89 at the other. A second bevel gear designated 90 is fixed to a rake cage drive shaft designated 91 and the bevel gear 90 is in meshing relationship with the bevel gear 88. The rake cage drive 91 is suitably journaled in the bearings 93' and a second similar bearing not clearly shown. The pulley wheel 93 that is secured to the opposite end of the rake cage drive has the belt 94 reeved around it and a similar, though much larger, pulley wheel 95 that is fixed to the shaft 52. Thus it can be readily seen that any rotation of the power take-off of the tractor will produce a rotating effect of the rake cage.

The transverse conveyor is also powered by the same drive system with the pulley 87 having the belt 96 reeved over it and the pulley wheel 97 respectively. Pulley wheel 97 is secured to the conveyor drive shaft 98 which is appropriately journaled in the bearing bracket 95. A gear designated 100 is secured to the other end of the conveyor drive shaft which meshes with a similar gear designated 101 on the shaft 66. The purpose of the extra gear in this conveyor drive system is to produce the direction of the rotation that is appropriate to drive the transverse conveyor as shown by the solid line arrows in Fig. 5. Having thus described my machine, I shall now briefly review its operation and the advantages gained by it.

It will be noted that the mounting of the rake on the forward end of the tractor, which in itself is not new, permits an excellent view of the work being done and also permits the rotary rake to pick up the hay before it is run over and mashed down by the tractor. With the rotary rake turning as shown by the broken line arrow in Fig. 2, any hay or the like in the path of the rake is gently lifted from the stubble, carried on the curved bands above the rake, above the ground a substantial distance and finally deposited on the divided platform trough supporting element. The transverse conveyor then carries the hay across the platform and gently dumps it from the unit with a rolling spreading action to produce a windrow that is loosely piled and fluffy. This windrow also has very little variation in its depth when viewed in cross section and therefore aids a baling machine if used in producing evenly packed bales. For the sake of emphasis, I would like to reiterate that the hay is turned over 180° during the raking and dumping action which permits the previously underneath side to face upwardly and thus be properly cured. It should also be noted that should the hay be rained on after it has been formed in windrows, the length of time required by it to dry may be shortened by simply re-raking the windrows and permitting the machine to flop them over, thus exposing the underside. It has been estimated that the use of this machine will permit the raking and windrowing of hay at least one day earlier, if not more, than with machines heretofore known.

It should be clear that I have invented a tremendously improved form of side delivery rake that produces numerous and unobvious beneficial and useful results.

Some changes may be made in the construction and arrangement of my side delivery rake without departing from the real spirit and purpose of my invention, and it is my invention to cover by my claims, any modified forms of structure or use of mechanical equivalents which may be reasonably included within their scope.

I claim:

1. In a side delivery rake for collecting cut agricultural products from a ground surface, a frame, a means secured to the front of said frame for lifting said cut agricultural products a substantial distance above said ground surface, an endless conveyor secured to said frame behind said lifting means and operating transversely of the direction of normal movement of said rake at a substantial distance above said ground surface, and a dumping platform secured to said frame at the discharge end of said conveying means; said dumping platform having its outer forward portion bias with respect to direction of travel of said conveying means.

2. In a side delivery rake for collecting cut agricultural products from a ground surface, a frame, a means secured to the front of said frame for lifting said cut agricultural products a substantial distance above said ground surface, an endless conveyor secured to said frame behind said lifting means and operating transversely of the direction of normal movement of said rake at a substantial distance above said ground surface, and a dumping platform secured to said frame at the discharge end of said conveying means; said dumping platform having its outer forward portion biased with respect to direction of travel of said conveying means; said dumping platform having its outer forward portion that is biased with respect to the normal direction of travel also rolled to extend down.

3. In a side delivery rake for raking out agricultural plant material, a frame, a rotary raking mechanism having raking fingers secured to the forward end of said frame, a plurality of curved supporting bands secured to said frame end flanking said fingers to slidably support the material raked with the same side of said material facing upwardly as before said material was raked, a divided raked material supporting platform trough secured to said frame to the rear of the upper rear surface of said curved supporting bands, rotatable wheels secured to said frame at opposite ends of the division in said divided platform trough, an endless flexible element arranged over said rotatable wheels, and means secured to and extending from said flexible element for engaging and moving agricultural material pushed on to said divided raked material supporting platform; said bands having their upper rear ends cut to present slanted ends to agricultural material being moved by said endless flexible element over said supporting platform trough to avoid snagging said agricultural material; some of said means secured to and extending from said flexible element being shorter than other of said means secured to and extending from said flexible element.

4. In a side delivery rake for collecting cut agricultural products from a ground surface, a frame, a means secured to the front of said frame for lifting cut agricultural products a substantial distance above a ground surface, bands arranged in a smooth curve near said lifting means and secured to said frame for supporting agricultural products as they are lifted; said bands having their upper rear edges slanted uniformly in one direction, an endless conveyor secured to said frame and moving transversely of the direction of movement of said lifting means; said conveyor being arranged a substantial distance above the ground surface and slightly below the highest level to which said lifting means raises agricultural products; said endless conveyor carrying cut agricultural products in a direction that moves them against the slanting ends of said bands, an agricultural products dumping platform secured to one end of said endless conveyor; said endless conveyor carrying cut agricultural products lifted thereto across said rake transversely and dumping cut agricultural products so carried off said dumping platform.

References Cited in the file of this patent

UNITED STATES PATENTS

| | | |
|---|---|---|
| 1,304,797 | Murphy | May 27, 1919 |
| 1,847,399 | Innes | Mar. 4, 1932 |
| 2,172,655 | Gallagher et al. | Sept. 12, 1939 |
| 2,507,635 | James | May 16, 1950 |
| 2,526,960 | McElhenney et al. | Oct. 24, 1950 |
| 2,609,651 | Cymara | Sept. 9, 1952 |